(12) United States Patent
Sato et al.

(10) Patent No.: US 8,577,197 B2
(45) Date of Patent: Nov. 5, 2013

(54) HEAT-RESISTANT OPTICAL UNIT

(75) Inventors: Yukiko Sato, Chiba (JP); Naoki Okada, Chiba (JP)

(73) Assignee: Fujikura Ltd., Tokyo (JP)

( * ) Notice: Subject to any disclaimer, the term of this patent is extended or adjusted under 35 U.S.C. 154(b) by 259 days.

(21) Appl. No.: 12/857,963

(22) Filed: Aug. 17, 2010

(65) Prior Publication Data

US 2012/0045185 A1 Feb. 23, 2012

(51) Int. Cl.
*G02B 6/44* (2006.01)

(52) U.S. Cl.
USPC ............ 385/109; 385/111; 385/112; 385/100

(58) Field of Classification Search
USPC .................................................. 385/109, 111
See application file for complete search history.

(56) References Cited

U.S. PATENT DOCUMENTS

| | | | | |
|---|---|---|---|---|
| 5,915,059 A * | 6/1999 | Takahashi et al. | ............. | 385/128 |
| 6,169,835 B1 * | 1/2001 | Lambert | ........................ | 385/104 |
| 7,016,578 B2 * | 3/2006 | Lee et al. | ........................ | 385/104 |
| 7,590,322 B2 * | 9/2009 | Puzan et al. | ................... | 385/109 |
| 2010/0232753 A1 * | 9/2010 | Parris et al. | .................... | 385/109 |
| 2011/0293228 A1 * | 12/2011 | Keller et al. | .................. | 385/103 |

FOREIGN PATENT DOCUMENTS

| | | |
|---|---|---|
| JP | 5-73820 U | 10/1993 |
| JP | 07-225330 A | 8/1995 |
| JP | 11-202169 A | 7/1999 |

* cited by examiner

*Primary Examiner* — Hemang Sanghavi
(74) *Attorney, Agent, or Firm* — Sughrue Mion, PLLC

(57) ABSTRACT

An optical unit is comprised of a plurality of optical base fibers twisted together without any member serving as a center of twisting so that each optical base fiber comes in contact with adjacent optical base fibers along the whole length, each of the optical base fibers including an optical fiber and a sleeve consisting essentially of silicone, a filler having the plurality of optical base fibers embedded therein, the filler consisting essentially of silicone, and a sheath covering the filler and the plurality of optical base fibers embedded in the filler.

9 Claims, 3 Drawing Sheets

HEAT-RESISTANT OPTICAL UNIT

BACKGROUND OF THE INVENTION

1. Field of the Invention

The present invention relates to an optical unit including an optical fiber preferably applied to various uses such as an oil well sensor for instance, which require thermal resistance.

2. Description of the Related Art

Optical fibers including optical fibers are used in various uses such as temperature sensors. To use optical fibers in high-temperature environments such as oil wells, high thermal resistance is needless to say required.

Applied to optical units in practical use so far are base fibers each comprised of an optical fiber made of glass or resin with a sleeve made of any heat-resistant resin such as polymethylmethacrylate (PMMA) covering the periphery thereof. Frequently a plurality of such base fibers are bundled together, enclosed with a metal tube, metal wires or a resin tape wound therearound into one or more layers, and further covered with a proper sheath. More specifically, heat-resistant optical units in general have multilayer structures.

Thermal expansion related to temperature change, or related to bend an optical unit, sometimes causes so-called "micro bend" because side pressure is given to base fibers in the optical unit. A micro bend given to base fibers is one of primary causes for increasing transmission loss. Optical base fibers of a graded index (GI) type are more susceptible to transmission loss increase induced by such micro bend caused by side pressure than optical base fibers of a single mode (SM) type. More specifically, optical units containing optical base fibers of a GI type require special structural measures against side pressure. Such structural measures, as well as the aforementioned multilayer structures, lead to enlargement of optical units in diameter.

In many practical uses, it is required to wire a large number of, or a great amount of, optical units and thus respective diameters of the optical units strongly dominate the total scale of the system of wiring. Therefore, enlargement of optical units in diameter is a technical problem to be solved.

SUMMARY OF THE INVENTION

Certain exemplary embodiments of the present invention provide an optical unit having thermal resistance and resistance against side pressure although being small in diameter.

A first aspect of the present invention, an optical unit is comprised of a plurality of optical base fibers twisted together without any member serving as a center of twisting so that each optical base fiber comes in contact with adjacent optical base fibers along the whole length, each of the optical base fibers including an optical fiber and a sleeve consisting essentially of silicone, a filler having the plurality of optical base fibers embedded therein, the filler consisting essentially of silicone, and a sheath covering the filler and the plurality of optical base fibers embedded in the filler.

Preferably, the plurality of optical base fibers consists of only three of the optical base fibers. Still preferably, each of the optical base fibers has a proof level of 1.5% or more. Alternatively preferably, the filler is formed to have a thickness of 10 µm or larger from outer peripheries of the optical base fibers to a surface of the filler. Further preferably, the sheath consists essentially of perfluoroalkoxyethylene.

A second aspect of the present invention, an optical unit is comprised of three optical base fibers twisted together without any member serving as a center of twisting and made in contact together along the whole length, each of the optical base fibers including an optical fiber and a sleeve consisting essentially of silicone, a filler having the plurality of optical base fibers embedded therein, the filler consisting essentially of silicone, and a sheath covering the filler and the plurality of optical base fibers embedded in the filler.

Preferably, each of the optical base fibers has a proof level of 1.5% or more. Still preferably, the filler is formed to have a thickness of 10 µm or larger from outer peripheries of the optical base fibers to a surface of the filler. Alternatively preferably, the sheath consists essentially of perfluoroalkoxyethylene.

DETAILED DESCRIPTION OF THE EXEMPLARY EMBODIMENTS

Exemplary embodiments of the present invention will be described hereinafter with reference to the appended drawings.

Figure 1:
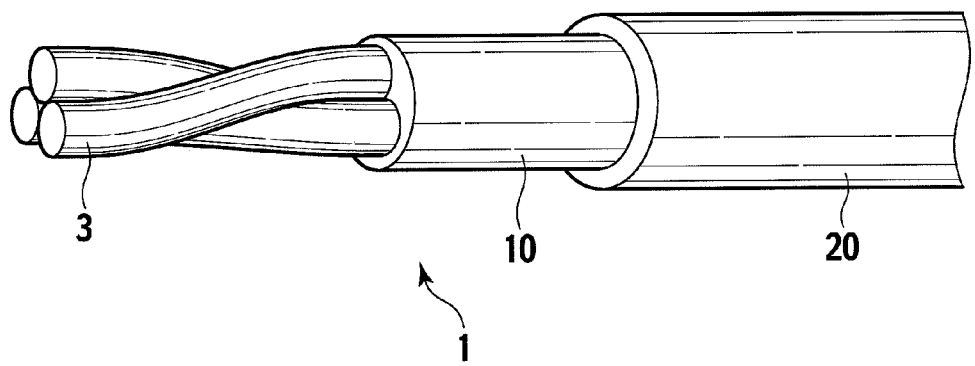
FIG. 1 is a perspective view of an optical unit in accordance with an embodiment of the present invention.
Figure 2:
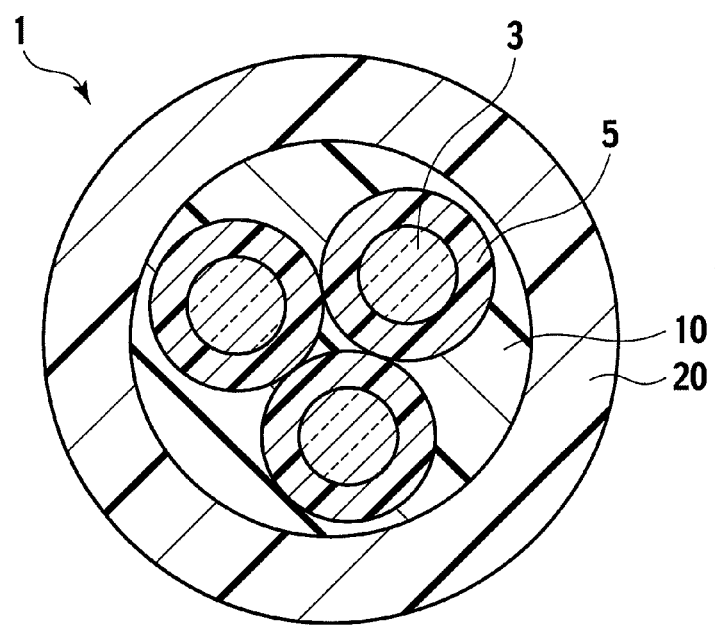
FIG. 2 is a cross sectional view of the optical unit.

Referring to FIGS. 1 and 2, an optical unit 1 has three optical base fibers, each of which is comprised of an optical fiber 3 and a sleeve 5.

Each optical base fiber is comprised of the optical fiber 3 of quartz glass or resin, the sleeve 5 of silicone, where the sleeve 5 substantially thoroughly covers the optical fiber 3 excepting its both ends. The silicone resin provides the optical base fibers with sufficient heat resistance and further has a function of dispersing or relaxing stress. As dispersion or relax of stress suppresses micro bend evoked by side pressure, a covering of silicone resin is favorable in view of suppressing transmission loss. Further silicone resin contributes to better adhesion to a filler 10 of silicone resin described later. Thickness of the sleeve 5 is preferably made thinner in view of diameter reduction of the unit.

Preferably each optical base fiber has a proof level of 1.5% or more. To apply optical base fibers of such a proof level improves resistance against tensile stress, thereby contributing to prevention of disconnection of the optical base fibers. The upper limit of the proof level is, as being restricted by up-to-date manufacturing techniques, limited to 5% or so, however, the optical base fibers may have a proof level greater than that if possible.

Further, diameters of the respective optical base fibers are preferably smaller in view of pursuit of diameter reduction of the optical unit, however, are preferably greater in view of prevention of failure such as disconnection. As an example, diameters about 250 µm are preferable but of course not limited thereto.

The three optical base fibers are made in contact together along the whole length and then twisted. The pitch of the twist is preferably, but not limited to, about 150 mm. There is no member serving as a center of the twist, and any of the base fibers does not serve as the center. The twist may be either clockwise or counterclockwise, or the direction of the twist can be reversed in the mid of the unit. Any number, larger than three, of optical base fibers may be instead twisted in the same way, if possible.

Such unitary twisting prevents stress concentration on any particular one of the base fibers if bending is given to the optical unit. Further the sleeves 5 of silicone included in the respective optical base fibers disperse or relax side pressure. Therefore overly loaded stress is not applied to any particular base fiber among these fibers and the base fibers in contact with each other do not exert side pressure on each other, even if temperature change is given to the optical unit or the optical unit is bent. Thus transmission loss caused by a micro bend is unlikely to increase. On the other hand, mutual contact of the base fibers prominently contributes to diameter reduction of the optical unit.

Optical base fibers of a SM type can be used. As the three base fibers are structurally equivalent, any one of them may be replaced with a base fiber of a GI type, or alternatively two or more of them may be replaced with base fibers of a GI type. Moreover any other type can be alternatively used. This provides greater freedom of design.

The twisted optical base fibers are embedded in a filler 10 of silicone without leaving any space therein. The space enclosed in the three base fibers is also filled with the filler 10. Silicone provides the optical unit with sufficient thermal resistance and further have a function of dispersing stress applied from the exterior. As the stress dispersion prevents generation of a micro bend evoked by side pressure, to be embedded in silicone is favorable in view of suppressing transmission loss. Silicone is preferably of a thermosetting type. The aforementioned structure is formed by impregnating the twisted optical base fibers with silicone, and heating them.

The filler 10 is required to have a sufficient diameter so as to sufficiently protect the optical base fibers embedded therein from applied side pressure. On the other hand, if the diameter is too large, it is opposed to the purpose of diameter reduction. Consequently a diameter which assures a thickness of at least 10 µm relative to outermost peripheries of the optical base fibers can be selected. This means that the diameter of the filler 10 will be about 560 µm if the diameter of the optical base fibers is about 250 µm as described above.

The aforementioned filler 10 and the base fibers embedded therein are covered with a proper sheath 20. The sheath is preferably of perfluoroalkoxyethylene (PFA). Alternatively any proper thermosetting resin can be applied thereto instead of the PFA. A thickness of the sheath 20 should be properly selected so as to assure sufficient protection ability and not to result in an excessive diameter and thus the diameter may be from 50 µm to 100 µm for example. Supposed that a diameter of the filler 10 is 560 µm as with the example described above and a thickness of the sheath 20 is exemplarily 80 µm, an outer diameter of the optical unit is about 720 µm. As existing heat-resistant optical units including a plurality of optical base fibers are in the order of several millimeters in diameter, it is apparent that the embodiment provides a prominent advantage in view of diameter reduction.

To verify effects provided by the optical unit according to the present embodiment, a publicly known proof test was conducted. Working examples served to the test are optical units, each of which was a set of three optical base fibers each having a proof level of 1.5% and a diameter of 250 µm, one of which was of a GI type and another of which were of a SM type, and formed by twisting the base fibers in a pitch of 150 mm per one turn, embedding them in a filler of silicone having a diameter of 560 µm, and covering them with a sheath of PFA. An outer diameter of them is 720 µm. To discriminate individual base fibers, two base fibers of a SM type among the three were colored to be blue and black respectively, and the base fiber of a GI type had a natural color. By using a known brake-capstan device regulated in ITU-T G.650.1, the proof test was carried out with regulating strains $\epsilon$. Two levels of 0.5% strain and 1.0% strain were tested. Existence or nonexistence of disconnections was examined by means of an Optical Time Domain Reflectometer (OTDR). Results are summarized in Table 1.

TABLE 1

Results of a test of applying stress
(Working Example)

| Strain $\epsilon$ (%) | Result |
| --- | --- |
| 0.5 | No disconnection |
| 1.0 | No disconnection |

The same proof test was carried out in regard to a comparative example. In the comparative example, an optical unit is formed by three optical base fibers of a GI type in a pitch of 150 mm per one turn, embedding them in a filler of silicone, and covering them with a sheath of PFA. Results of a proof test identical to that described above is shown in Table 2.

TABLE 2

Results of a test of applying stress
(Comparative Example)

| Strain $\epsilon$ (%) | Result |
| --- | --- |
| 0.5 | Disconnection occurs |

As being understood from Table 1, in the working example, any disconnection was not observed either in a case where 0.5% strain was applied or a case where 1.0% strain was applied. To the contrary, as being understood from Table 2, in the comparative example, disconnection occurred even in a case where only 0.5% strain was applied. While a brake-capstan device in the course of test execution controls tension in a longitudinal direction, such a test is also useful in examination of resistance against side pressure because contact of optical units with capstans and pulleys causes side pressure. More specifically, it is confirmed, by comparing the comparative example therewith, that the optical unit in accordance with the present embodiment is unlikely to produce disconnection although it is small in diameter, and thus it does not require special precaution in handling.

Figure 3:
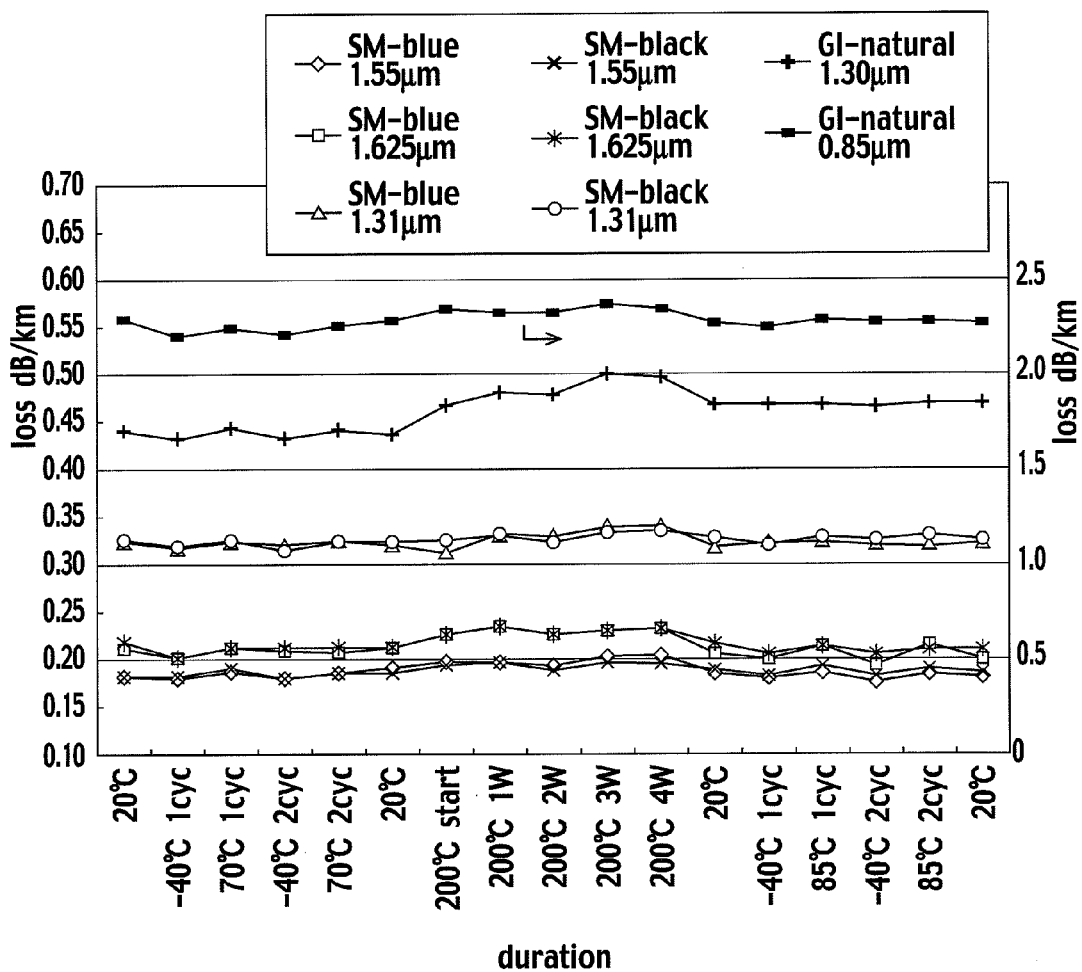
FIG. 3 is a graph showing a result of a thermal resistance test in regard to an example.
Figure 4:
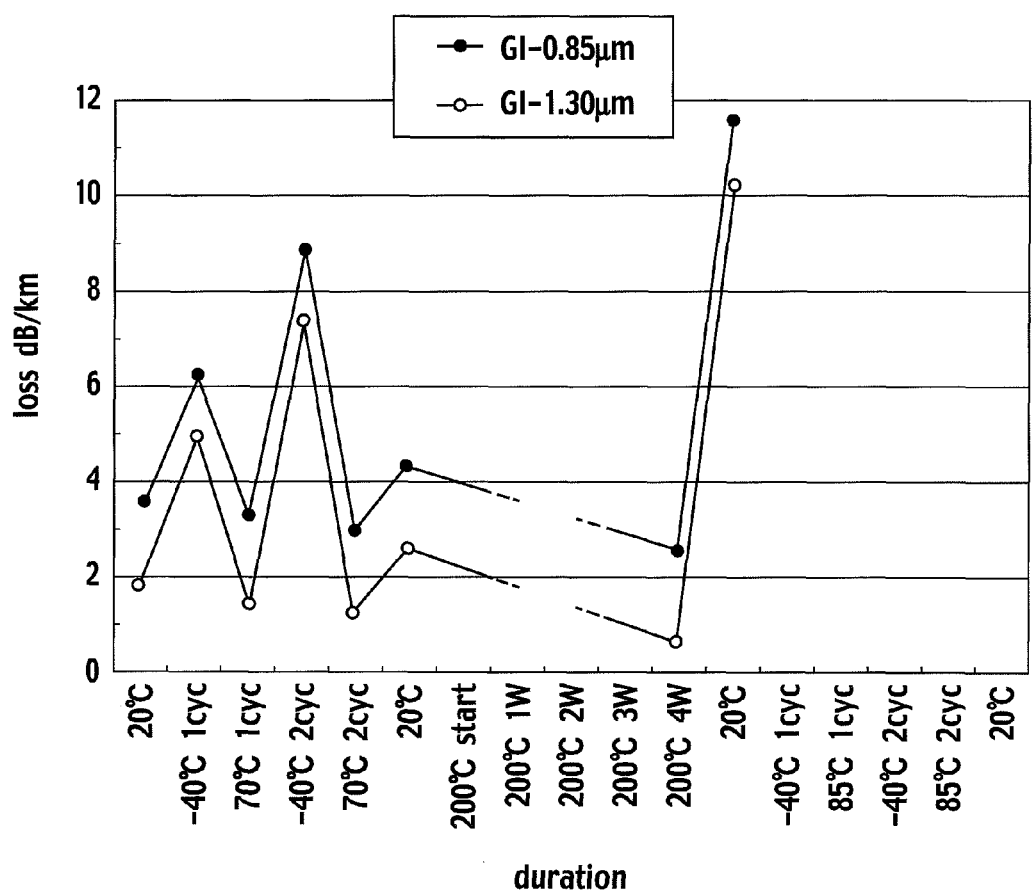
FIG. 4 is a graph showing a result of a thermal resistance test in regard to a comparative example.

FIG. 3 shows results of a heat test on the working examples. Even after a one-month heat test, any notable increase in transmission loss is not acknowledged. FIG. 4 shows results of a heat test on the comparative examples. Cooling and heating steps cause considerably large increase in transmission loss as compared with the working examples. In particular, when the test specimen is subject to a load at 200 degrees C. and thereafter returned to 20 degrees C. (normal temperature), this thermal cycle presents notably large transmission loss. More specifically, it is confirmed that the optical unit in accordance with the present embodiment is superior also in thermal resistance to the comparative examples.

As described above, it is asserted that the present embodiment provides an optical unit being superior in resistance against side pressure and thermal resistance although being small in diameter.

Although the invention has been described above by reference to certain exemplary embodiments of the invention, the invention is not limited to the exemplary embodiments described above. Modifications and variations of the embodiments described above will occur to those skilled in the art, in light of the above teachings.

What is claimed is:

1. An optical unit comprising:
a plurality of optical base fibers twisted together without any member serving as a center of twisting so that each optical base fiber comes in contact with adjacent optical base fibers along the whole length, each of the optical base fibers including an optical fiber and a sleeve consisting essentially of silicone resin;
a filler having the plurality of optical base fibers embedded therein, the filler consisting essentially of silicone resin; and
a sheath covering the filler and the plurality of optical base fibers embedded in the filler.

2. The optical unit of claim 1, wherein the plurality of optical base fibers consists of only three of the optical base fibers.

3. The optical unit of claim 1, wherein each of the optical base fibers has a proof level of 1.5% or more.

4. The optical unit of claim 1, wherein the filler is formed to have a thickness of 10 µm or larger from outer peripheries of the optical base fibers to a surface of the filler.

5. The optical unit of claim 1, wherein the sheath consists essentially of perfluoroalkoxyethylene.

6. An optical unit comprising:
three optical base fibers twisted together without any member serving as a center of twisting and made in contact together along the whole length, each of the optical base fibers including an optical fiber and a sleeve consisting essentially of silicone resin;
a filler having the plurality of optical base fibers embedded therein, the filler consisting essentially of silicone resin; and
a sheath covering the filler and the plurality of optical base fibers embedded in the filler.

7. The optical unit of claim 6, wherein each of the optical base fibers has a proof level of 1.5% or more.

8. The optical unit of claim 6, wherein the filler is formed to have a thickness of 10 µm or larger from outer peripheries of the optical base fibers to a surface of the filler.

9. The optical unit of claim 6, wherein the sheath consists essentially of perfluoroalkoxyethylene.

* * * * *